United States Patent [19]

Shiraishi et al.

[11] Patent Number: 5,042,610
[45] Date of Patent: Aug. 27, 1991

[54] FOUR-WHEEL DRIVE VEHICLE

[75] Inventors: Masaru Shiraishi; Manabu Hiketa, both of Hiroshima, Japan

[73] Assignee: Mazda Motor Corporation, Hiroshima, Japan

[21] Appl. No.: 238,194

[22] Filed: Aug. 30, 1988

[30] Foreign Application Priority Data

Sep. 1, 1987 [JP] Japan .............................. 62-216387
Sep. 30, 1987 [JP] Japan .............................. 62-248493

[51] Int. Cl.$^5$ ............................................. B60K 17/35
[52] U.S. Cl. ..................................... 180/249; 475/221
[58] Field of Search ............... 180/233, 245, 246, 247, 180/248, 249, 250; 74/711, 665 G, 665 R, 447, 665 C, 665 A, 665 B, 710.5

[56] References Cited

U.S. PATENT DOCUMENTS 3,800,626 4/1974 Koivunen .............................. 74/695

FOREIGN PATENT DOCUMENTS

| 0131892 | 1/1985 | European Pat. Off. . |
| 0226666 | 7/1987 | European Pat. Off. . |
| 2589109 | 4/1987 | France . |
| 57-126727 | 8/1982 | Japan . |
| 61-66028 | 4/1986 | Japan . |
| 61-155028 | 7/1986 | Japan . |
| 2133360 | 7/1984 | United Kingdom . |

Primary Examiner—Anores Kashnikow
Assistant Examiner—Richard Camby
Attorney, Agent, or Firm—Fleit, Jacobson, Cohn, Price, Holman & Stern

[57] ABSTRACT

A four-wheel drive vehicle including an engine of which output shaft extends transversely, a transmission connected with one side of the engine transversely through a clutch or a torque converter, an inter-axle differential machanism constituted by a planetary gear machanism, a first inter-wheel differential mechanism of a bevel gear type for transmitting a driving force to first wheels which are located closer to the engine than second wheels longitudinally, second inter-wheel differential mechanism for transmitting the driving force the second wheels through transfer gear mechanism, propeller shaft mechanism, and inter-axle differential restricting mechanism for restricting a differential operation. The inter-axle differential mechanism, input gear means of the transfer gear mechanism and the first inter-wheel differential mechanism are coaxially disposed on an axle of the first wheels. The inter-axle differential mechanism is disposed at one side of the first inter-wheel mechanism where the engine is located with regard to a transverse direction of the vehicle and in a space formed by a clutch housing receiving the clutch or the torque converter. The input gear mechanism and the inter-axle differential restricting mechanism are received in a transfer housing connected to a side end of the clutch housing where the engine is located with regard to the transverse direction of the vehicle.

6 Claims, 7 Drawing Sheets

FOUR-WHEEL DRIVE VEHICLE

CROSS-REFERENCE OF THE RELATED APPLICATIONS

The present application relates to co-pending U.S. patent application Ser. No(s). 42,809 filed on Apr. 27, 1987 and entitled "four wheel drive vehicle", 86,479 filed on Aug. 18, 1987 entitled "VEHICLE FOUR DRIVE SYSTEM" and 91,029 filed on Aug. 31, 1987 and entitled "INTER-AXLE DIFFERENTIAL RESTRICTION DEVICE FOR VEHICLE FOUR WHEEL DRIVE SYSTEMS", U.S. Pat. No. 4,779,699, issued on Oct. 25, 1988, U.S. Pat. No. 4,875,979 issued Oct. 24, 1989, U.S. Pat. No. 4,817,753 issued Apr. 4, 1989.

BACKGROUND OF THE INVENTION

1. Field of the Invention

The present invention relates to a four-wheel drive vehicle, specifically to a four-wheel drive vehicle provided with a transversely extended engine and an inter-axle differential mechanism of a planetary gear type for splitting a drive torque between front and rear wheels and an inter-wheel differential mechanism coaxially disposed with the inter-axle differential mechanism on an axle of one of the front and rear wheels which is clear to the engine in a transverse direction of the vehicle.

2. Description of the Prior Art

In a four-wheel drive vehicle in which an engine power is transmitted to drive both front and rear wheels through a torque converter and transmission, some of the vehicles are provided with not also inter-wheel differential mechanism for splitting an engine torque between the front wheels or the rear wheels but also inter-axle mechanism for splitting the engine torque between the front wheels and the rear wheels to thereby eliminate so-called braking effect of the vehicle caused by a rotation speed difference between the front and rear wheels during a cornering operation of the vehicle.

In this type of four-wheel drive vehicle having the transversely arranged engine, the inter-axle differential mechanism is coaxially mounted with one of the inter-wheel differential mechanisms on one of axles of the front and rear wheels which is disposed closer to the engine. Japanese Patent Public Disclosure No. 61-66028, laid open to the public on July 14, 1986, discloses a four-wheel drive vehicle comprises an engine transversely disposed at a front side of the vehicle, an inter-axle differential mechanism coaxially mounted with a front inter-wheel differential mechanisms of a bevel gear type on a front axle. The inter-axle differential mechanism is arranged at one side of the inter-wheel differential mechanism where the inter-wheel mechanism faces to the engine. The four-wheel drive mechanism is also provided with an inter-axle differential restricting device for controlling a differential operation of the inter-axle differential mechanism so as to restrict a differential movement between front and rear axles under a certain condition.

In a power transmitting mechanism for a four-wheel drive vehicle, it is critical that a transfer mechanism constituted by an inter-axle differential mechanism, inter-wheel differential mechanism arranged close to an engine and the like and integrally connected with the engine and transmission is provided as compact as possible.

Meanwhile, there is provided a transfer housing for receiving the transfer mechanism.

The four-wheel drive mechanism disclosed in the Japanese Patent Public Disclosure No. 61-155028 is disadvantageous in that the inter-axle differential restricting device is located outside of the front inter-wheel differential mechanism to cause a housing portion for receiving the front inter-wheel mechanism to increase in size.

Japanese Patent Public Disclosure No. 57-126727 discloses a four-wheel drive mechanism including a trans-axle housing connected with an engine and receiving a clutch and transmission and a transfer housing connected with the trans-axle housing at one side of the trans-axle housing which side is close to the engine. In this arrangement, a joint surface of the trans-axle housing and the transfer housing is aligned with a joint surface of the trans-axle housing with the engine so that the transfer housing projects transversely toward the engine. This limits the transfer housing space for receiving a catalytic converter and the like.

SUMMARY OF THE INVENTION

It is, therefore, an object of the present invention to provide a four-wheel drive vehicle provided with a compact transfer mechanism.

It is another object of the present invention to provide a compact transfer mechanism for a four-wheel drive vehicle provided with an engine transversely disposed and transmission transversely extended and connected with the engine, an inter-axle differential mechanism and an inter-wheel differential mechanism coaxially mounted on an axle disposed closer to the engine.

It is still another object of the present invention to provide a compact housing structure for a four-wheel drive mechanism.

It is further object of the present invention to provide a four-wheel drive mechanism in which there can be obtained a space enough to lay out a catalytic converter and the like.

The above and other objects can be accomplished by a four-wheel drive vehicle including an engine of which output shaft extends transversely, a transmission connected with one side of the engine with regard to a transverse direction of the vehicle through a clutch or a torque converter, an inter-axle differential mechanism constituted by a planetary gear mechanism including a ring gear, a sun gear and a pinion carrier carrying pinions engaged with the ring gear and the sun gear, a first inter-wheel differential mechanism of a bevel gear type for transmitting a driving force from the inter-axle differential mechanism to first right and left wheels which are located close to the engine comparing with second right and left wheels with regard to a longitudinal direction of the vehicle, a second inter-wheel differential mechanism for transmitting the driving force from the inter-axle differential mechanism to the second right and left wheels through transfer gear mechanism, propeller shaft means, and inter-axle differential restricting means for controlling the inter-axle differential mechanism so as to restrict a differential operation, the inter-axle differential mechanism, input gear means of the transfer gear mechanism and the first inter-wheel differential mechanism being coaxially disposed on an axle of the first wheels, the inter-axle differential mechanism being disposed at one side of the first inter-wheel mechanism where the engine is located with regard to a transverse direction of the vehicle and in a space formed by a clutch housing receiving the clutch of the torque converter, the space being formed at a side of the clutch housing where the transmission is located with regard to the transverse direction of the vehicle, the input gear means and the inter-axle differential restricting means being received in a transfer housing connected to a side end of the clutch housing where the engine is located with regard to the transverse direction of the vehicle.

The inter-axle differential restricting means is provided with outer tubular means, inner tubular means and a plurality of circular plate means for transmitting a torque between the outer and inner tubular means, the outer and inner tubular means being relatively rotatably and coaxially disposed, the outer tubular means being connected with the input gear means of the transfer mechanism, the inner tubular means being connected with first tubular shaft means, the second tubular shaft means being inserted into second tubular means which connects the input gear means of the transfer mechanism with one of output members of the inter-axle differential mechanism, an axle of one of the first wheels being extended axially in the first tubular shaft means.

The four-wheel drive vehicle comprises oil seal means for sealing oil flow between the transfer housing and the clutch housing, the oil seal means being disposed between an inner surface of the transfer housing and an outer surface of the second tubular shaft, an inner surface of the second tubular shaft means and an outer surface of the first tubular shaft means, and an inner surface of the first tubular shaft means and an outer surface of the axle of the one of the first wheels.

According to the above arrangement of the present invention, the inter-axle differential mechanism is constituted by a planetary type differential mechanism so that a dimension of the transfer mechanism can be reduced in the transverse direction.

The inter-axle differential mechanism is disposed within a space formed in the clutch housing or the trans-axle housing in which the clutch device or torque converter is received wherein the space is formed at one side of the housing where the transmission is located in the transverse direction of the vehicle. As a result, the inter-axle differential mechanism and the first inter-wheel differential mechanism can be disposed close to the engine and the transmission in the longitudinal direction of the vehicle. The first inter-wheel differential mechanism is constituted by a bevel gear type differential mechanism so that a dimension of the differential mechanism in the longitudinal direction of the vehicle can be reduced. This means that the transmission case can be reduced in size and is a whole, a dimension of the transfer device can be reduced.

The first inter-wheel differential mechanism is coaxially mounted with the inter-axle differential mechanism on an axle for the first wheels wherein the first inter-wheel differential mechanism is located at a side of the inter-axle differential mechanism where the transmission is located in the transverse direction of the vehicle. The transfer gear mechanism for transmitting the driving force to the second inter-wheel differential mechanism is disposed at the other side of the inter-axle differential mechanism so that the driving force is splitted at the inter-axle differential mechanism and transmitted the first and second inter-wheel differential mechanisms in the transverse and opposite directions. This means that a driving force transmitting path can be simplified to obtain a compact layout of the transfer mechanism and facilitate an assembling work thereof.

A peripheral portion of the axle of the first wheels between the input gear means of the transfer device and the inter-axle differential mechanism is reduced in a radial direction of the axle, a radial expanded portion of the clutch housing being located in the vicinity of the peripheral portion.

As a result the axle can be disposed as close as possible to the clutch housing in the longitudinal direction of the vehicle.

In another aspect of the present invention, a four-wheel drive vehicle comprises an engine transversely disposed, a trans-axle housing transversely connected with one side of the engine and receiving a power transmitting means for controlling and transmitting a driving force from the engine, a transfer housing connected with a side of the trans-axle housing where the engine is located and receiving at least bevel gear means for changing a direction in which the driving force is transmitted, a first inter-wheel differential mechanism arranged for first wheels which are located closer to the engine than second wheels with regard to a longitudinal direction of the vehicle and received one of the trans-axle housing and the transfer housing and a second inter-wheel differential mechanism arranged for the second wheels and connected with a propeller shaft connected with the bevel gear means. The vehicle comprises a joint surface of the trans-axle housing with the transfer housing offset from a joint surface of the trans-axle housing with the engine in the transverse direction of the vehicle.

According to the above arrangement, the trans-axle housing is disposed close to the transmission in the transverse direction of the vehicle so that a space in the vicinity of the engine in the direction of the transverse direction of the vehicle can be obtained to dispose the catalytic converter and the other accessories.

The above and other objects and features of the present invention will be apparent from the following description by taking reference with accompanying drawings employed for a preferred embodiment of the present invention.

DETAILED DESCRIPTION OF PREFERRED EMBODIMENTS

Figure 1:
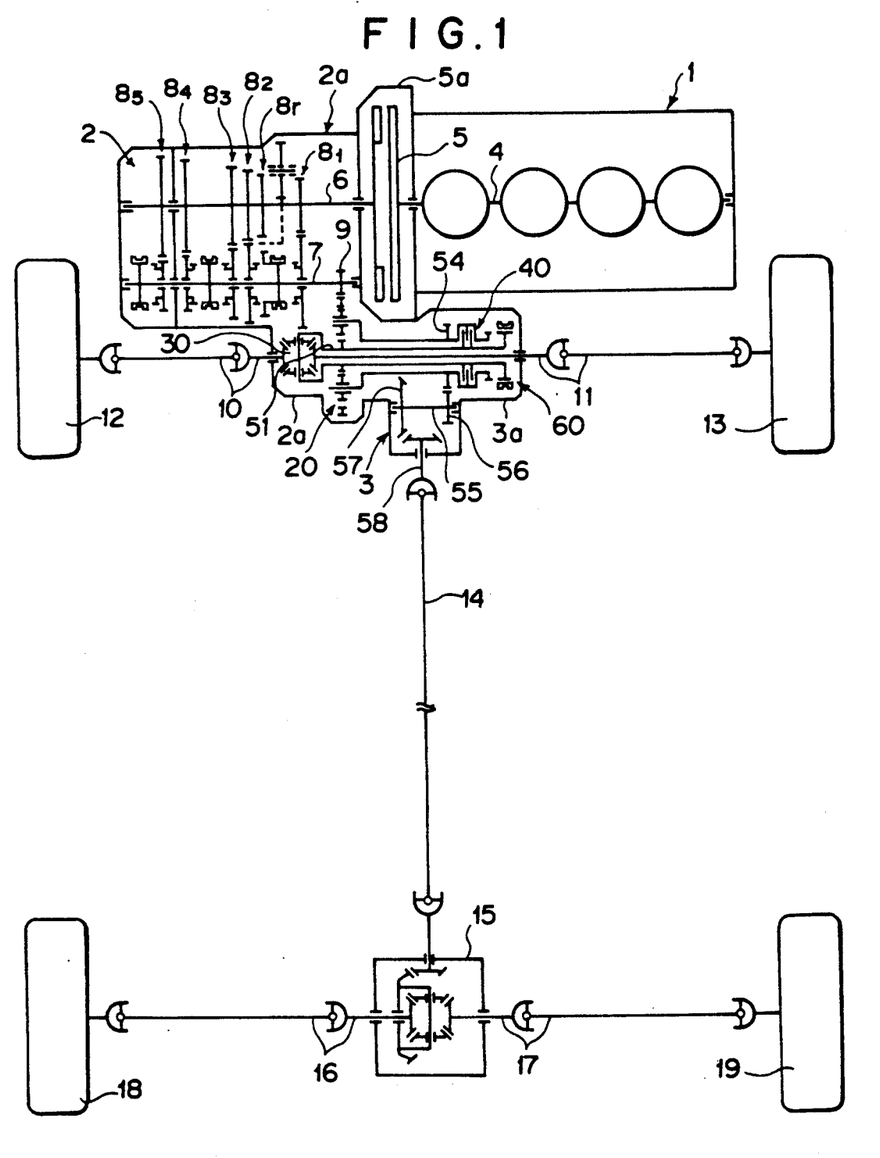
FIG. 1 is a schematic view of a four-wheel drive vehicle in accordance with the present invention.

Referring to FIG. 1, there is shown a schematic view of a four-wheel drive vehicle provided at a front portion thereof with an engine 1, a transmission disposed in a transmission case 2a and a transfer device 3 which is basically received in a transfer housing 3a. The engine 1, transmission 2 and the transfer device 3 constitute a power plant. The engine 1 is arranged in a manner that an output shaft 4 thereof is extended in a transverse direction of the vehicle. The transmission 2 is arranged in the same manner as the engine 1 wherein an input shaft 6 connected with the output shaft 4 of the engine 1 and an output shaft 7 in parallel with the input shaft 6 are transversely extended. There is arranged gear trains 8, -8s, 8r for selectively providing one of first through fifth and reverse gear stages between the output shafts 6 and 7. An output gear 9 is provided for transmitting a driving force from the transmission 2 to the transfer device 3 at an end portion of the output shaft 7 where a clutch 5 is located in the transverse direction of the vehicle.

The transfer device 3 is adapted to split and transmit the driving force to front right and left wheels 12 and 13 through front axles 10 and 11 respectively and transmit the driving force to rear right and left wheels 18 and 19 through a propeller shaft 14 extending longitudinally, a rear differential mechanism 15, rear axles 16 and 17 extending transversely from the rear differential mechanism 15.

Figure 2:
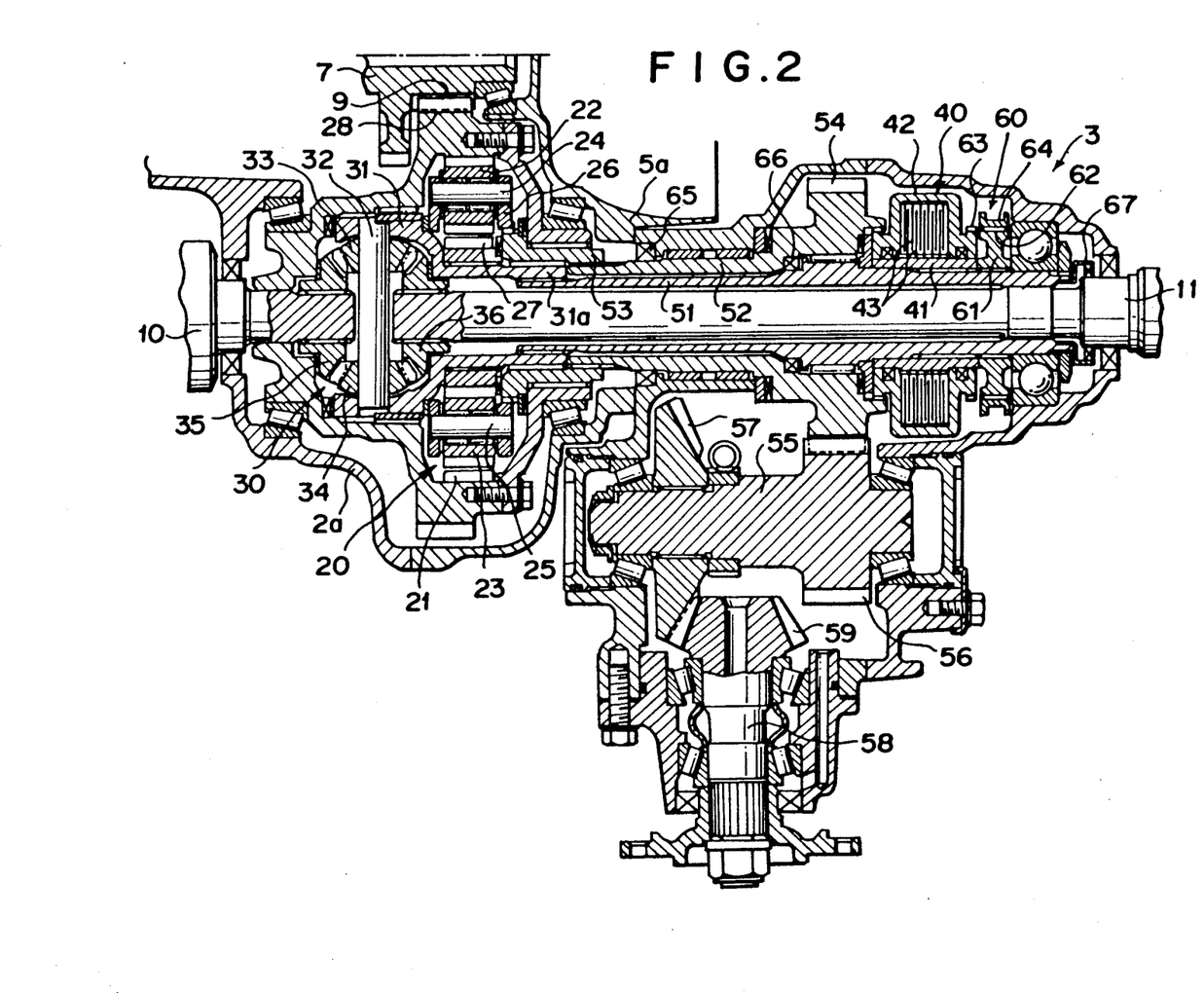
FIG. 2 is a sectional view of a transfer device of the four-wheel drive vehicle as shown in FIG. 1.

Referring to FIG. 2, the transfer device 3 is provided with a center differential mechanism or inter-axle differential mechanism 20 of a planetary type differential mechanism and a front differential mechanism 30 of a bevel gear type differential mechanism arranged on an axis of the front axles 10, 11 and a viscous coupling 40 coaxially disposed with the center differential mechanism 20 is constituted by a double pinion type planetary gear mechanism and is provided with a ring gear 21, first pinions 22 disposed inside of the ring gear 21 and engaged with the ring gear 21, second pinions 23 engaged with the first pinions, a pinion carrier 26 for carrying the first and second pinions 22, 23 through pinion shafts 24, 25 and a sun gear engaged with the pinions 23.

Figure 3:
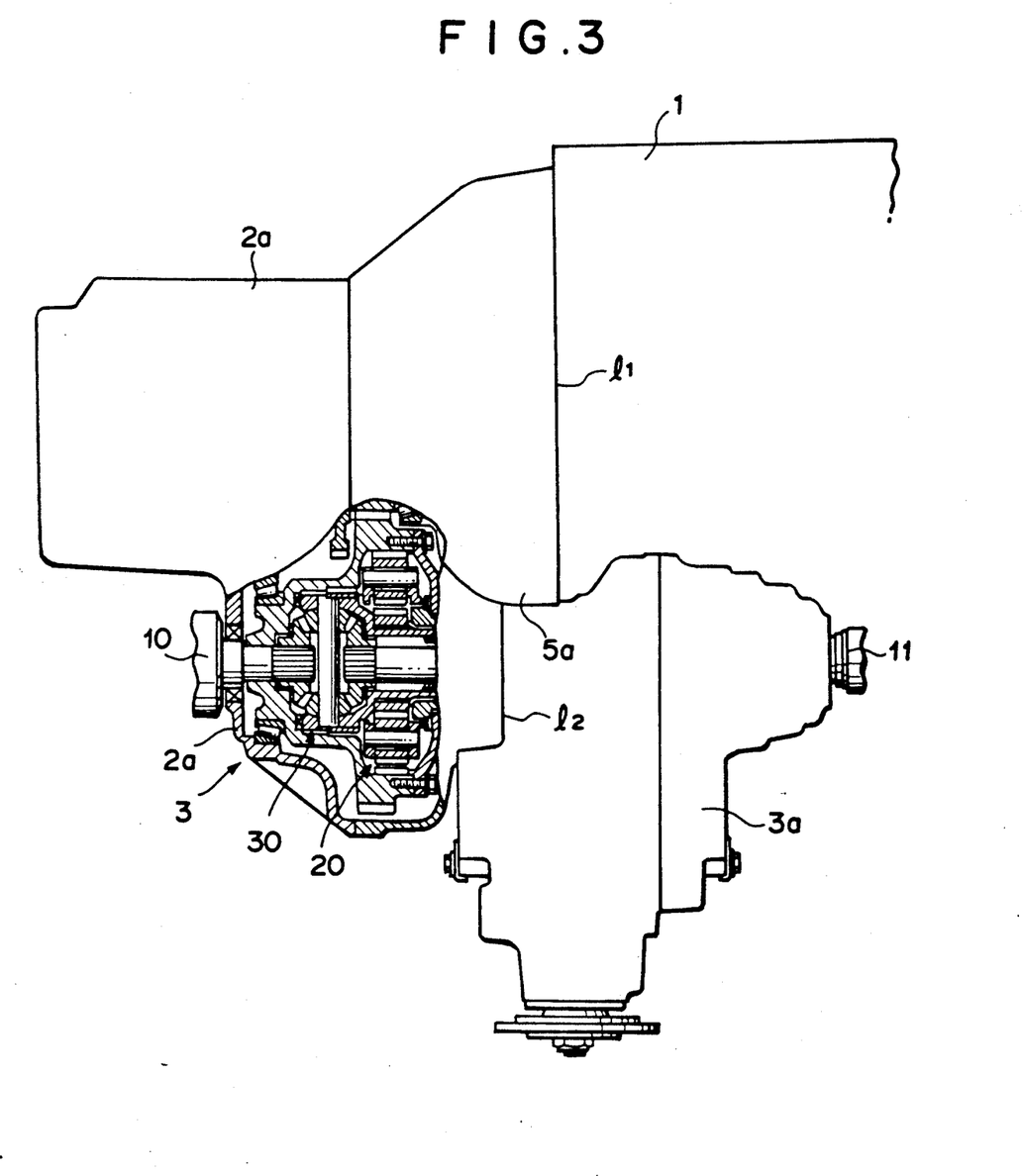
FIG. 3 is a partly broken view of the transfer device.

As shown in FIG. 3, the center differential mechanism 20 is so arranged that a front part thereof is received in a space which is formed at one side of a rearwardly extended housing portion of a clutch housing 5a (converter housing in the case where the transmission 2 is of an automatic type), which side is adjacent to the transmission in the transverse direction of the vehicle.

As shown in FIG. 2, an input gear 28 integrally formed with the ring gear 21 at a peripheral portion of the ring gear 21 of the center differential mechanism 20 is brought into a meshing engagement with the output gear 9 formed at an end (adjacent to the clutch 5) of the output shaft 7 of the transmission 2 so that the driving force from the transmission 2 is transmitted to the ring gear 21 through the output gear 9 and input gear 28.

The front differential mechanism 30 is provided with a differential gear case 1, a pinion shaft 32 disposed perpendicular to an axis of the front axles 10, 11, a pair of pinions of bevel gear 33, 34, a pair of side gears 35, 36 engaged with the pinions 33, 34. The side gears 35, 36 are connected with end portions of the front axles 10 and 11 respectively. The front differential mechanism 30 is disposed coaxially with the center differential mechanism 20 on the axis of the axles 10, 11 and located at one side of the center differential mechanism 20 adjacent to the transmission 2. An extension 31a of the differential case 31 toward the engine 1 is connected with the sun gear 27 which is one of output elements of the center differential mechanism 20 so that the driving force is transmitted from the sun gear 27 to the differential gear case 31.

At a side of the center differential mechanism 20 adjacent to the engine 1, there is provided a first tubular shaft 51 rotatably mounted on the front right axle 11 and a second tubular shaft 52 rotatably mounted on the first tubular shaft 51 with an overlapped relationship. One end of the first tubular shaft 51 is connected with the extension 31a of the differential gear case 31 of the front differential mechanism 30. One end of the second tubular shaft 52 is connected with the pinion carrier 26 which is the other of the output elements of the center differential mechanism 20 through an intermediate member 53. The first and second tubular shafts 51 and 52 extend transversely through a radial expanded portion of the clutch housing 5a toward the engine 1. At the tip end of the second tubular shaft 52 adjacent to the engine 1, a first transfer gear 54 is integrally formed with the second tubular shaft 52. The first transfer gear 54 is engaged with a second transfer gear 56 formed on one end of an intermediate shaft 55 disposed in parallel with the axis of the front axles 10, 11. There is formed a third transfer gear 57 of a bevel gear at the other end of the intermediate shaft 55. The transfer gear 57 is meshed with a fourth transfer gear 59 integrally formed on one end of an output shaft 58 extending in the longitudinal direction of the vehicle. The output shaft 58 is connected with the propeller shaft 14 as shown in FIG. 1.

The viscous coupling 40 is provided with a tubular inner case 41, an outer case 42, a plurality of plate members 43 disposed between the cases 41, 42 with a spaced relationship with each other and alternatively connected with the cases 41, 42, and a viscous fluid filled within a space formed by the cases 41, 42. The viscous coupling 40 is disposed on the front right axle 11 and located at one side of the first transfer gear 54 adjacent to the engine 1. The inner case 41 is connected with the first tubular shaft 51 and the outer case 42 is connected with the second tubular shaft 52 respectively. There is disposed a hub 61 connected with the first tubular shaft 51 in the vicinity of one side of the viscous coupling 40 adjacent to the engine 1 in the transverse direction. Further there is provided a lock mechanism 60 constituted by a first spline 62 formed on the hub 61, a second spline 64 formed on the outer case 42, a sleeve 63 which can be engaged with both the first and second splines 62, 63. There are further provided seal members 65, 66, and 67 as shown in FIG. 2 around the axle 11, first tubular shaft 51 and second tubular shaft 52.

According to FIG. 2 and 3, the transmission case 2a and the clutch housing are provided with rearwardly extended housing portions connected with each other by which a part of the transfer device 3 is covered. The rearwardly extended housing portion of the clutch housing 5a is joined with the transfer housing 3a at a side opposite to the extended housing portion of the transmission case 2 as shown in FIG. 2 and 3. A joint line $l_2$ of the extended housing portion of the clutch housing 5a and the transfer housing 3a is transversely offset toward the transmission 2 from a joint line $l_1$ of the clutch housing 5a and engine 1.

In operation, the driving force from the engine 1 is transmitted to the clutch 5 and then to the transmission 2. Thereafter, the driving force is transmitted to the ring gear 21 of the center differential mechanism 20 through the output gear 9 of the transmission 2 and the input gear 28. In the center differential mechanism 20, the driving force is split and introduced to the sun gear 27 and the pinion carrier 26. The driving force introduced to the sun gear 27 is transmitted to the differential case 31 of the front differential mechanism 30 in which the driving force is further split and transmitted to the front right and left wheels 12, 13 through the front axles 10, 11. On the other hand, the driving force introduced to the pinion carrier 26 is transmitted to the rear differential mechanism 15 through the intermediate member 53, the second tubular shaft 52, the first and second transfer gears 57, 59, the output shaft 58 and the propeller shaft 14, the driving force is splitted in the rear differential mechanism 15 and introduced to the rear right and left wheels 18 and 19 through the rear axles 16, 17. Thus, a four wheel drive operation can be accomplished.

In this case, when the sleeve 64 of the lock mechanism 60 is engaged with only the first spline 62, the first spline 62 connected through the hub 61, first tubular shaft 51, an extension 31 of the differential case 31 in the front differential mechanism 30 with the sun gear 27 as an output member for the front wheels 12, 13 is disengaged from the pinion carrier 29 connected through the outer case 42 of the viscous coupling 40, second tubular shaft 52 and intermediate member 53 with the second spline 62 as an output member for the rear wheels 18, 19. In this case, a differential operation between the sun gear 27 and the pinion carrier 26 is allowed to prevent the front wheels 12, 13 and rear wheels 18, 19 from causing a braking effect. Further, the viscous coupling 40 connecting the sun gear 27 with the pinion carrier 26 through the first and second tubular shafts 51, 52 is caused to be actuated to suppress an over differential operation of the center differential mechanism 20. As a result, a driving stbility can be obtained during a cornering operation.

On the other hand, in the case where the sleeve 64 of the lock mechanism 60 is engaged with both the first and second splines 62 and 63, the inner case 41 and outer case 42 of the viscous coupling 40 are joined with each other so that the viscous coupling 40 is not operated. In this case, the sun gear 27 is joined with the pinion carrier 26 through the first and second tubular shafts 51, 52 so that the center differential mechanism 20 is locked. Thus, even where one of the wheels 12, 13, 18 and 19 is in a muddy spot which provides an unloaded condition of the wheel, the other wheels are prevented from slipping because the driving force is transmitted thereto.

According to the above structure of the four-wheel drive mechanism, the center differential mechanism 20 is so arranged that a front part thereof is received in a space which is formed at one side of the radial expanded portion of the clutch housing 5a, which side is adjacent to the transmission 2 in the transverse direction of the vehicle. Further, radial extended elements located on the axis of the front axles 10, 11 such as the center differential mechanism 20, viscous coupling 40, lock mechanism 60 and front differential mechanism 30 and the like which are extended radially around the axis are disposed in such an arrangement that they do not interfere with the radial expanded portion of the clutch housing 5a. This arrangement allows one to dispose the front axles 10, 11 as close as possible to the clutch housing 5a in the logitudinal direction of the vehicle to accomplish a compact structure of the four-wheel drive mechanism.

The rearwardly extended housing portions of the transmission case 2a and the clutch housing 5a are provided at one side of the radial expanded portion of the clutch housing 5a adjacent to the transmission 2 in such an arrangement that the extended housing portions cover the space formed at the one side of the clutch housing 5a adjacent to the transmission 2. Specifically, the rearwardly extended housing portions of the transmission case 2a and the clutch housing 5a which is constituted to receive the center differential mechanism 20 and front differential mechanism 30 and accessories thereof can be reduced in size longitudinally. Further, the center differential mechanism 20 constituted by the planetary type differential mechanism is effected to provide not only a compact size of the transmission case 2a and clutch housing 5a transversely but also a transversely reduced structure of the whole four-wheel drive mechanism which is concentrated at a transversely central portion of the vehicle. The viscous coupling 40 is disposed close to the engine 1 transversely at a position where an interference with the expanded portion of the clutch housing 5a is avoided so that a difference in length between the front right axle 10 and front left axle 11 can be reduced.

The front differential mechanism 30 for transmitting the driving force to the front wheels 12, 13 is located at one side of the center differential mechanism 20 adjacent to the transmission 2 and the first - fourth transfer gears 54, 56, 57 and 58 are located at the other side of the center differential mechanism 20 adjacent to the engine 1 so that a driving force transmitting path from the center differential mechanism 20 to the front and rear wheels 12, 13 and 18, 19 can be simplified and facilitate a layout of elements for transmitting the driving force to the wheels 12, 13, 18 and 19.

Hereinafter, there is described another embodiment of the present invention taking reference to FIG. 4 through 7.

The same members as the former embodiment are referred by the same numerals and the detailed explanations thereabout are omitted.

In this embodiment, there are provided a trans-axle housing 70 formed by a transmission case 2a and a clutch housing 5a.

As shown in FIG. 4, 5, 6 and 7, the trans-axle housing 70 is provided with a rearwardly extended housing portion by which a viscous coupling 40 and center differential mechanism 20 are covered. The rearwardly extended housing portion of the trans-axle housing 70 is joined with the transfer housing 3a at a side opposite to the extended housing portion of the transmission case 2 as shown in FIGS. 2 and 3. A joint line 1₂ of the extended housing portion of the trans-axle housing 70 and the transfer housing 3a is transversely offset toward the trasmission 2 from a joint line 1₂ of the trans-axle housing 70 and engine 1.

In this embodiment, the center differential mechanism 20, viscous coupling 40, and front differential mechanism 30 are disposed coaxially on the front right and left axle 11.

The viscous coupling 40 is located at one side of the center differential mechanism 20 transversely in a close relationship with each other and both the viscous coupling 40, which side is adjacent to the transmission 2 and the center differential mechanism 20 are received in the rearwardly extended housing portion of the trans-axle housing 70. The front differential mechanism is located at the other side of the center differential mechanism 20 in a transversely spaced relationship with the center differential mechanism 20.

The front differential mechanism 30 and first through fourth transfer gears 54, 56, 57, and 59 and the intermediate shaft 55 are received in the transfer housing 3a.

Figure 4:
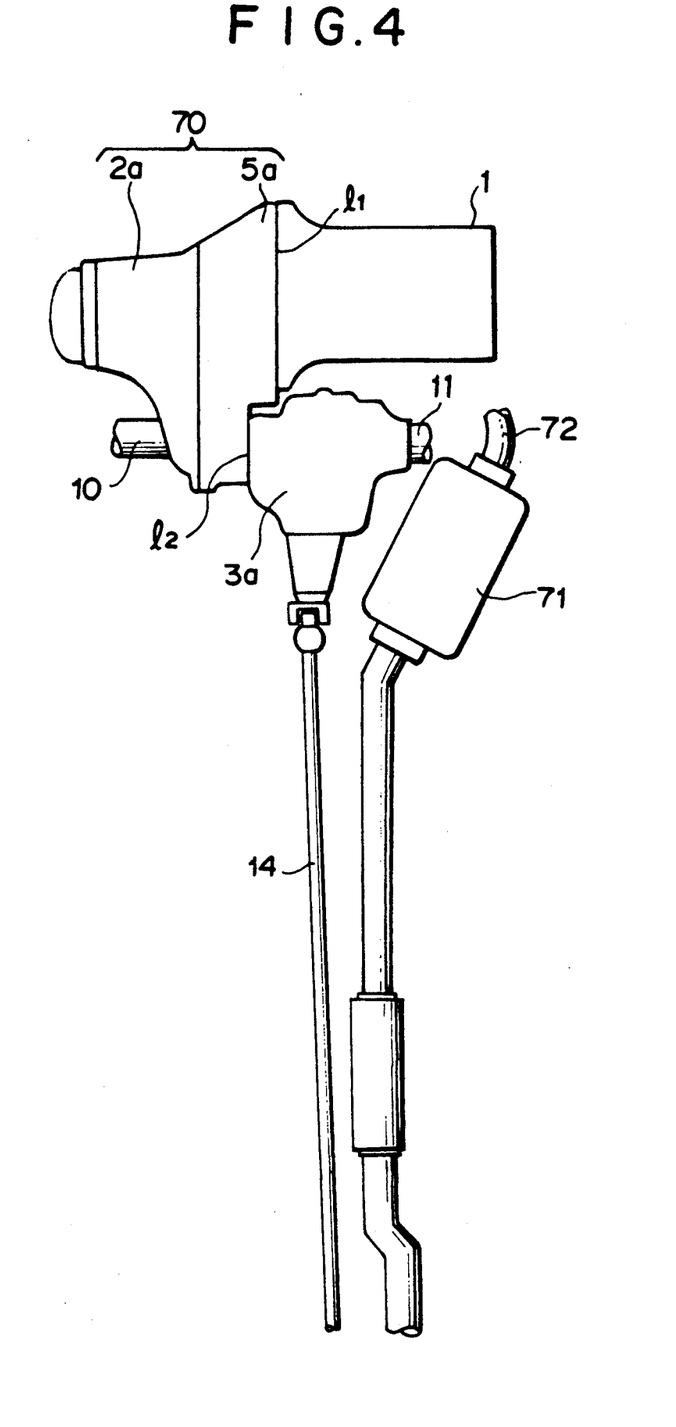
FIG. 4 is a schematic view of a four-wheel drive vehicle in accordance with another embodiment of the present invention.
Figure 5:
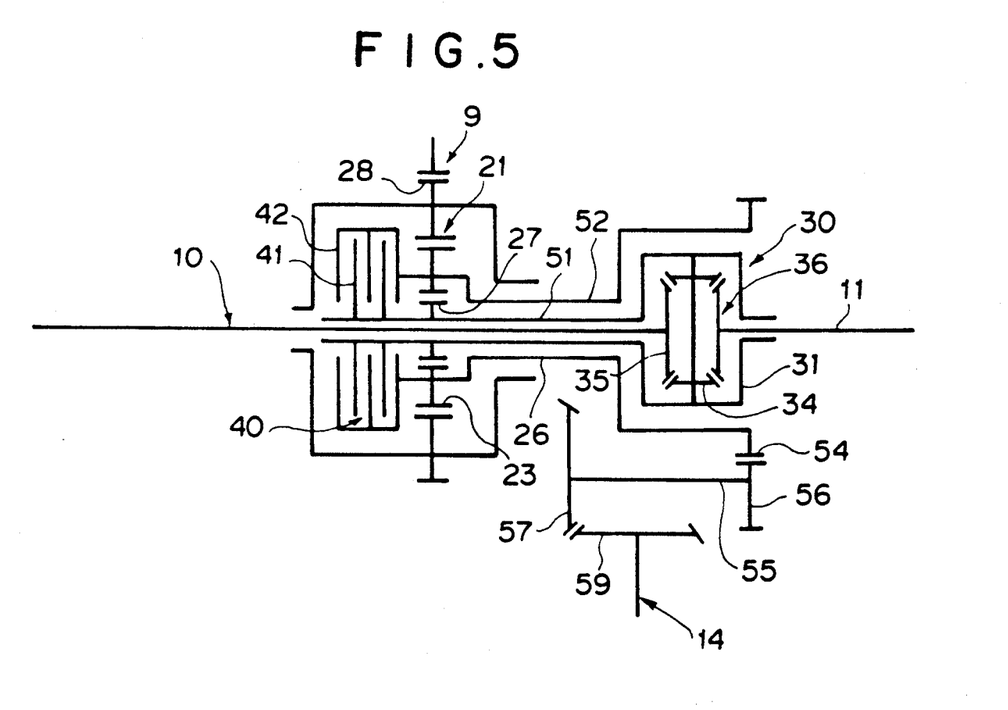
FIG. 5 is a schematic view showing a transfer device in accordance with the embodiment of FIG. 4.
Figure 6:
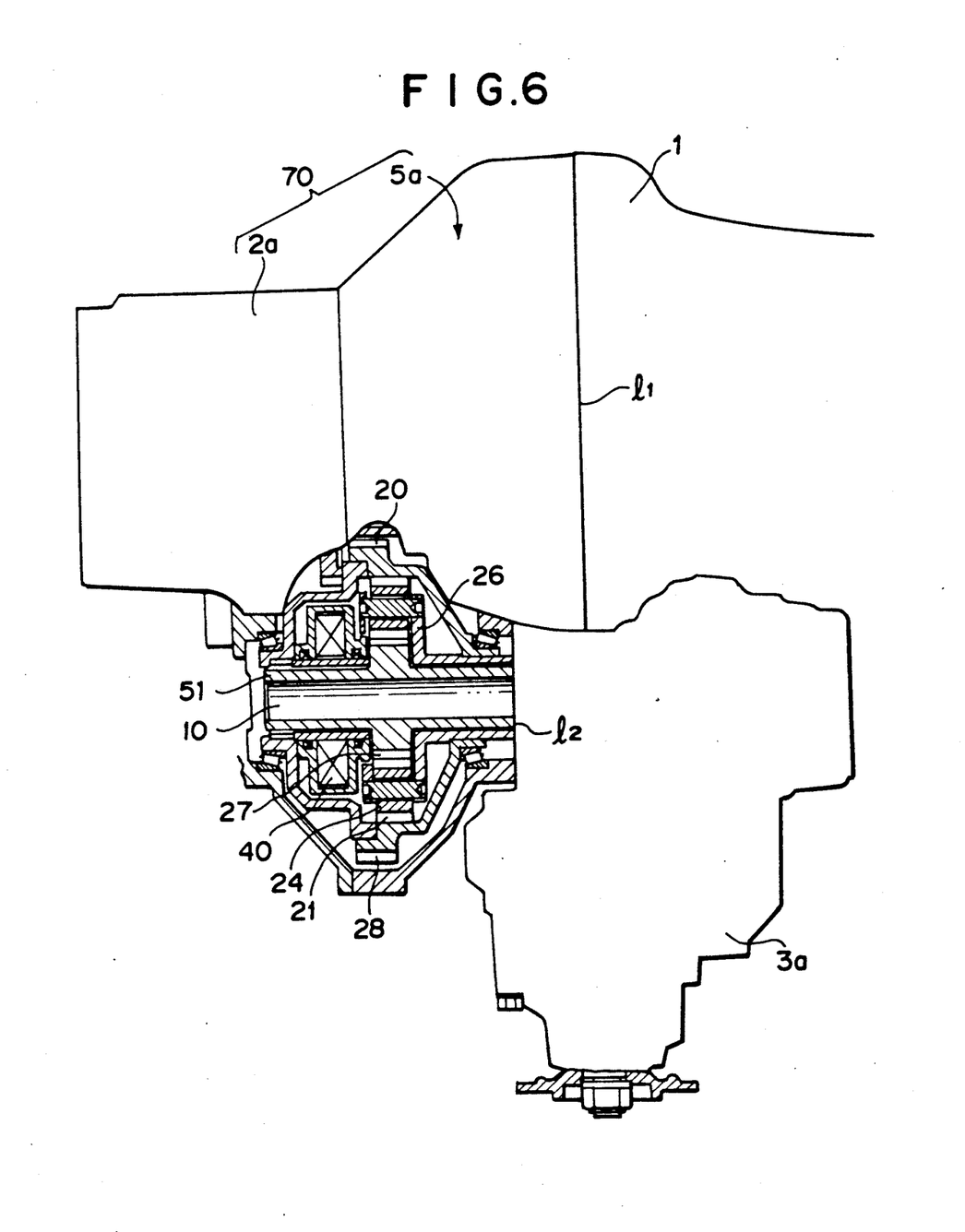
FIG. 6 is a partly broken view showing the transfer device of FIG. 5.
Figure 7:
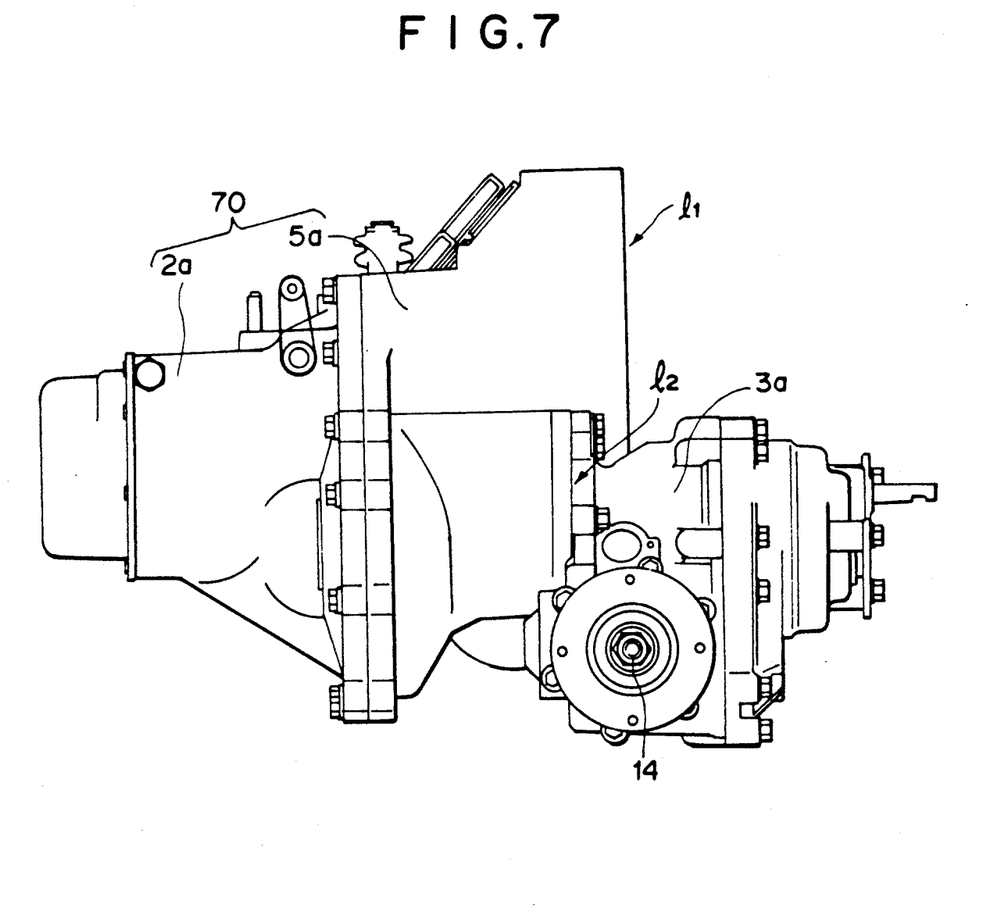
FIG. 7 is an end view showing housings for the transfer device of FIG. 6.

As shown in FIG. 4, there are disposed an exhaust system having a catalytic converter 71 and an exhaust gas pipe connected to the converter 72 in a space formed at one side of the transfer housing 3a, which side is adjacent to the engine 1.

In operation, the driving force is transmitted from the output gear 9 to the input gear 28 and to the double pinion type center differential mechanism 20 through the ring gear 21. Thereafter, the driving force is transmitted to the sun gear 27 through the pinion gears 23 and to the front differential mechanism 30 through the first tubular shaft 51. The driving force is finally introduced to the front wheels 12, 13 through the differential case 31 and the side gear 35, 36.

In the center differential mechanism 20, the driving force introduced to the pinion gears 23 is transmitted to the transfer gears 54, 56, 57 and 59 through the second tubular shaft 52 and to the rear differential mechanism 15 through the propeller shaft 14 for driving the rear wheels 18, 19.

In this arrangement, as described above in connection with the former embodiment, the center differential mechanism 20 is so arranged that a front part thereof is received in a space which is formed at one side of the radial expanded portion of the clutch housing 5a, which side is adjacent to the transmission 2 in the transverse direction of the vehicle. Further, radial extended elements located on the axis of the front axles 10, 11 such as the center differential mechanism 20, viscous coupling 40, lock mechanism 60 and front differential mechanism 30 and the like which are extended radial around the axis are disposed in such an arrangement that they are not interfere with the radial expanded portion of the clutch housing 5a. This arrangement one to dispose the front axles 10, 11 as close as possible to the clutch housing 5a in the longitudinal direction of the vehicle to accomplish a compact structure of the four-wheel drive mechanism.

The rearwardly extended housing portion of the trans-axle housing 70 is provided at one side of the radial expanded portion of the clutch housing 5a adjacent to the transmission 2 in such an arrangement that the extended housing portions cover the space formed at the one side of the clutch housing 5a adjacent to the transmission 2.

As described above, the joint line 1, of the extended housing portion of the trans-axle housing 70 and the transfer housing 3a is transversely offset toward the transmission 2 from the joint line 1, of the trans-axle housing 70 and engine 1 so that transfer device 3 can be disposed close to the transmission 2 transversely. This facilitates forming a space at one side of the transfer housing adjacent to the engine 1, in which space the converter 71 and the like can be disposed.

In the above embodiment, although the planetary gear mechanism is employed for the center differential mechanism 20, the planetary gear mechanism could be employed for the front differential mechanism 30. In this case, the arrangement of the center and front differential mechanisms be replaced.

It will be apparent that many modifications and variations may be made based on the above descriptions by those skilled in the art without apart from the scope of the claims as attached.

We claim:

1. In a four-wheel vehicle,
   an engine having an output shaft which extends transversely,
   a transmission connected with one side of the engine with regard to a transverse direction of the vehicle through a clutch or a torque converter,
   an inter-axle differential mechanism constituted by a planetary gear mechanism including a ring gear, a sun gear and a pinion carrier carrying pinions engaged with the ring gear and the sun gear,
   a first inter-wheel differential mechanism of a bevel gear type for transmitting a driving force from the inter-axle differential mechanism to first right and left wheels which are located close to the engine as compared with second right and left wheels with regard to a longitudinal direction of the vehicle,
   a second inter-wheel differential mechanism for transmitting the driving force from the inter-axle differential mechanism to the second right and left wheels through a transfer gear mechanism,
   propeller shaft means, and
   inter-axle differential restricting means for controlling the inter-axle differential mechanism so as to restrict a differential operation, the inter-axle differential mechanism, the input gear means of the transfer gear mechanism, and the first inter-wheel differential mechanism being coaxially disposed on an axle of the first wheels, the inter-axle differential mechanism being disposed at one side of the first inter-wheel differential mechanism where the engine is located with regard to a transverse direction of the vehicle and in a space formed by a clutch housing receiving the clutch or the torque converter, the space being formed at a side of the clutch housing where the transmission is located with regard to the transverse direction of the vehicle, the input gear means and the inter-axle differential restricting means being received in a transfer housing connected to a side end of the clutch housing where the engine is located with regard to the transverse direction of the vehicle, the planetary gear mechanism being of a type in which the driving force is introduced to the planetary gear mechanism through the ring gear and transmitted from the planetary gear mechanism through the sun gear and the pinion gear, the ring gear being formed at an inner side of a ring member which is formed at an outer side with an input gear meshed with an output gear of the transmission, opposite ends of the ring member being rotatably carried by the clutch housing forming said space through tubular supporting means.

2. A four-wheel drive vehicle in accordance with claim 1 wherein the first inter-wheel differential mechanism is provided with a differential case rotatably disposed within a space formed by the tubular supporting means, the space being located adjacent to the transmission, one end of the differential case and a side gear which are located transversely adjacent to the transmission being directly supported by an inner surface of the tubular supporting means in the axial direction.

3. In a four-wheel vehicle,
   an engine having an output shaft which extends transversely,
   a transmission connected with one side of the engine with regard to a transverse direction of the vehicle through a clutch or a torque converter,
   an inter-axle differential mechanism constituted by a planetary gear mechanism including a ring gear, a sun gear and a pinion carrier carrying pinions engaged with the ring gear and the sun gear, a first inter-wheel differential mechanism of a bevel gear type for transmitting a driving force from the inter-axis differential mechanism to first right and left wheels which are located close to the engine as compared with second right and left wheels with regard to a longitudinal direction of the vehicle, a second inter-wheel differential mechanism for transmitting the driving force from the inter-axle differential mechanism to the second right and left wheels through a transfer gear mechanism, propeller shaft means, inter-axle differential restricting means for controlling the inter-axle differential mechanism so as to restrict a differential operation, the inter-axle differential mechanism, the input gear means of the transfer gear mechanism, and the first inter-wheel differential mechanism being coaxially disposed on an axle of the first wheels, the inter-axle differential mechanism being disposed at one side of the first inter-wheel differential mechanism where the engine is located with regard to a transverse direction of the vehicle and in a space formed by a clutch housing receiving the clutch or the torque converter, the space being formed at a side of the clutch housing where the transmission is located with regard to the transverse direction of the vehicle, the inter-axle differential restricting means being located at a side of the input gear means of the transfer gear mechanism adjacent to the engine in the transverse direction of the vehicle, the input gear means and the inter-axle differential restricting means being received in a transfer housing connected to a side end of the clutch housing where the engine is located with regard to the transverse direction of the vehicle, the inter-axle differential restricting means being located at a side of the input gear means of the transfer gear mechanism adjacent to the engine in the transverse direction of the vehicle, the inter-axle differential restricting means being provided with outer tubular means, inner tubular means and a plurality of circular plate means together defining a viscous coupling for transmitting a torque between the outer and inner tubular means, the outer and inner tubular means being relatively rotatably and coaxially disposed, the outer tubular means being connected with the input gear means of the transfer mechanism, the inner tubular means being connected with first tubular shaft means, the second tubular shaft means being inserted into second tubular means which connects the input gear means of the transfer mechanism with one of output members of the inter-axle differential mechanism, an axle of one of the first wheels being extended axially in the first tubular shaft means, and sleeve means for connecting the inner and outer tubular means mechanically, the sleeve means being located at a side of the inter-axle differential restricting means adjacent to the engine in the transverse direction.

4. In a four-wheel vehicle, an engine having an output shaft which extends transversely, a transmission connected with one side of the engine with regard to a transverse direction of the vehicle through a clutch or a torque converter, an inter-axle differential mechanism constituted by a planetary gear mechanism including a ring gear, a sun gear and a pinion carrier carrying pinions engaged with the ring gear and the sun gear, a first inter-wheel differential mechanism of a bevel gear type for transmitting a driving force from the inter-axle differential mechanism to first right and left wheels which are located close to the engine as compared with second right and left wheels with regard to a longitudinal direction of the vehicle, a second inter-wheel differential mechanism for transmitting the driving force from the inter-axle differential mechanism to the second right and left wheels through a transfer gear mechanism, propeller shaft means, inter-axle differential restricting means for controlling the inter-axle differential mechanism so as to restrict a differential operation, the inter-axle differential mechanism, the input gear means of the transfer gear mechanism, and the first inter-wheel differential mechanism being coaxially disposed on an axle of the first wheels, the inter-axle differential mechanism being disposed at one side of the first inter-wheel differential mechanism where the engine is located with regard to a transverse direction of the vehicle and in a space formed by a clutch housing receiving the clutch or the torque converter, the space being formed at a side of the clutch housing where the transmission is located with regard to the transverse direction of the vehicle, the input gear means and the inter-axle differential restricting means being received in a transfer housing connected to a side end of the clutch housing where the engine is located with regard to the transverse direction of the vehicle, the inter-axle differential restricting means being provided with outer tubular means, inner tubular means and a plurality of circular plate means for transmitting a torque between the outer and inner tubular means, the outer and inner tubular means being relatively rotatably and coaxially disposed, the outer tubular means being connected with the input gear means of the transfer mechanism, the inner tubular means being connected with first tubular shaft means, the second tubular shaft means being inserted into second tubular means which connects the input gear means of the transfer mechanism with one of output members of the inter-axle differential mechanism, an axle of one of the first wheels being extended axially in the first tubular shaft means, and oil seal means for sealing oil flow between the transfer housing and the clutch housing, the oil seal means being disposed between an inner surface of the transfer housing and an outer surface of the second tubular shaft, an inner surface of the second tubular shaft means and an outer surface of the first tubular shaft means, and an inner surface of the first tubular shaft means and an outer surface of the axle of the one of the first wheels.

5. In a four-wheel vehicle, an engine having an output shaft which extends transversely, a transmission connected with one side of the engine with regard to a transverse direction of the vehicle through a clutch or a torque converter, an inter-axle differential mechanism constituted by a planetary gear mechanism including a ring gear, a sun gear and a pinion carrier carrying pinions engaged with the ring gear and the sun gear, a first inter-wheel differential mechanism of a bevel gear type for transmitting a driving force from the inter-axle differential mechanism to first right and left wheels which are located close to the engine as compared with second right and left wheels with regard to a longitudinal direction of the vehicle, a second inter-wheel differential mechanism for transmitting the driving force from the inter-axle differential mechanism to the second right and left wheels through a transfer gear mechanism, propeller shaft means, and inter-axle differential restricting means for controlling the inter-axle differential mechanism so as to restrict a differential operation, the inter-axle differential mechanism, the input gear means of the transfer gear mechanism, and the first inter-wheel differential mechanism being coaxially disposed on an axle of first wheels, the inter-axle differential mechanism being disposed at one side of the first inter-wheel differential mechanism where the engine is located with regard to a transverse direction of the vehicle and in a space formed by a clutch housing receiving the clutch or the torque converter, the space being formed at a side of the clutch housing where the transmission is located with regard to the transverse direction of the vehicle, the input gear means and the inter-axle differential restricting means being received in a transfer housing connected to a side end of the clutch housing where the engine is located with regard to the transverse direction of the vehicle, a joint surface of the transfer housing and clutch housing being offset from a joint surface of the clutch housing and the engine transversely opposite to the engine.

6. A four-wheel drive vehicle in accordance with claim 5 wherein a peripheral portion of the axle of the first wheels between the input gear means of the transfer device and the inter-axle differential mechanism is reduced in a radial direction of the axle, a radial expanded portion of the clutch housing being located in the vicinity of the peripheral portion.

* * * * *